July 7, 1970 J. A. BOTT 3,519,180
LUGGAGE RACK
Filed Oct. 21, 1968
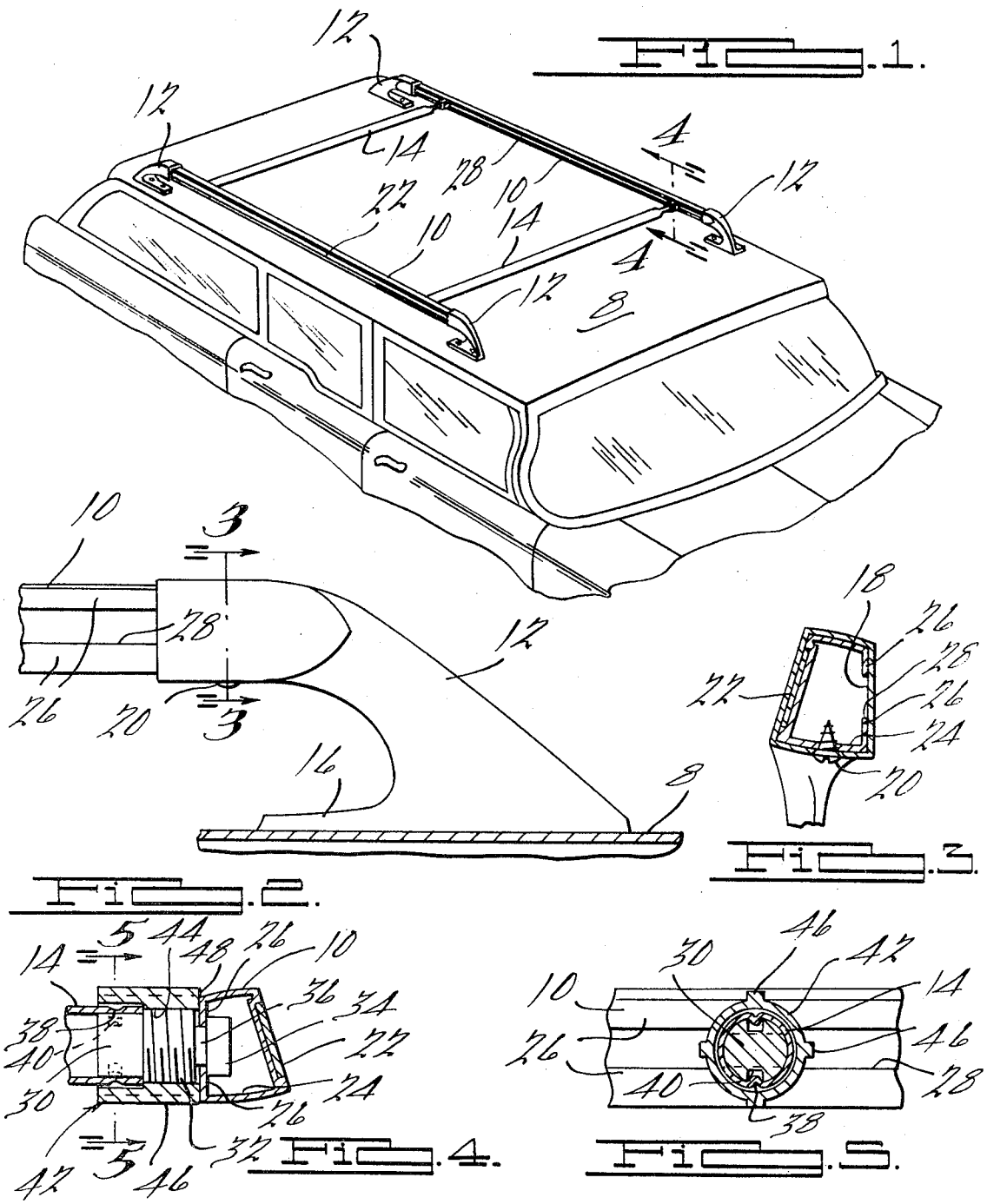
INVENTOR
John A. Bott
BY
Harness, Dickey & Pierce
ATTORNEYS United States Patent Office 3,519,180
Patented July 7, 1970

3,519,180
LUGGAGE RACK
John A. Bott, 931 Lake Shore Drive,
Grosse Pointe Shores, Mich. 48236
Filed Oct. 21, 1968, Ser. No. 769,306
Int. Cl. B60r 9/04
U.S. Cl. 224—42.1           6 Claims

ABSTRACT OF THE DISCLOSURE

An automobile luggage rack in which a pair of side rails extending longitudinally of the vehicle are supported by stanchions which enclose the opposite ends of the side rails. Cross bars extend between the side rails and are adjustable longitudinally of the side rails. The cross bars are locked in desired positions by threaded locking collars which clamp against the side rails.

SUMMARY OF THE INVENTION

Among the objects of the present invention are the provision of a luggage rack which is convenient to use, inexpensive, sturdy, and reliable in construction, composed of a minimum number of parts, readily assembled, and easily adapted to fit a wide variety of vehicles.

The foregoing objects are achieved in a luggage rack wherein longitudinally extending side rails are supported by stanchions at their opposite ends and adjustable cross members extend between the side rails. The cross members carry guides which ride in guideways extending longitudinally of the side rails to permit longitudinal adjustment of the cross bars. The cross bars are locked in selected positions by the rotation of locking collars threaded on the guides to clamp against walls of the side rails.

DESCRIPTION OF THE VIEWS OF THE DRAWINGS

FIG. 1 is a perspective view of a luggage rack embodying the present invention shown mounted on a fragmentarily illustrated automobile;

FIG. 2 is an enlarged side elevational view of a portion of the structure illustrated in FIG. 1;

FIG. 3 is a sectional view of the structure illustrated in FIG. 2, taken on the line 3—3 thereof;

FIG. 4 is a sectional view of the structure illustrated in FIG. 1, taken along the line 4—4 thereof; and FIG. 5 is a sectional view of the structure illustrated in FIG. 4, taken along the line 5—5 thereof.

DESCRIPTION OF THE PREFERRED EMBODIMENT

FIG. 1 shows the luggage rack as employing a pair of parallel laterally spaced side rails 10 extending longitudinally of the vehicle and supported at their opposite ends above a vehicle roof by a pair of stanchions 12. A pair of longitudinally spaced parallel cross bars 14 extend perpendicularly between the side rails 10. Each stanchion 12 has a base 16 at its lower end fastened to the roof 8 and an open socket 18 at its upper end which receives one end of a side rail 10. Each socket 18 is of a cross sectional shape conforming to the outer cross sectional shape of the side rail 10. The manner of retaining the side rails 10 in the sockets 18 is illustrated in FIG. 3 as comprising a screw 20, which is threaded through the wall of the socket 18 and into the side rail 10.

The side rails 10 may be made from a variety of materials and by different methods although they are desirably of uniform cross sectional shape throughout their lengths. Such materials as stainless steel, chrome plate steel or aluminum may be readily utilized. If steel is used, the desired shape may be achieved by the well-known roll forming process. If metal such as aluminum is used, the desired shape is achieved through an extrusion process. Each side rail 10 is illustrated as having a decorative insert 22 positioned on the outer side thereof. The general cross sectional shape of the side rail 10 is hollow, providing a guideway in the form of a channel 24 extending longitudinally of the side rail. The inner side of each side rail 10 is provided with two longitudinally extending vertically spaced walls 26 which are separated by a slot 28 providing communication between the channel 24 and the outer periphery of the side rail.

The guideways or channels 24 are adapted to cooperate with guides 30 positioned at each end of each of the cross bars 14. Each guide 30 is fitted into one end of its associated cross bar 14, and projects therefrom to define an exposed external thread 32, a flange portion 34 at its free end, and a reduced diameter portion 36 intermediate the thread 32 and the flange portion 34. The reduced diameter portion 36 will be seen to lie within the slot 28 and between the walls 26. The attachment of the guides 30 to the cross bars 14 as achieved by a pair of swaged indentations 38 in the cross bar 14 which project into recesses 40 formed in each guide 30. Accordingly, the cross bar 14 may be said to be "staked" to the guides 30. Each guide flange portion 34 rides within a guideway 24 and cooperates with an associated locking collar 42 to clamp the guide in a selected position. There is one collar 42 for each guide 30 and each collar has an internal thread 44 threaded onto the thread 32 of the guide 30. Radially outwardly extending ribs 46 are formed on the collars 42 to facilitate the gripping and rotation thereof. Rotation of a collar 42 will bring an annular shoulder 48 thereof to bear against the outer sides of the walls 26 so as to clamp the walls 26 between the shoulder 48 and the guide flange portion 34. The direction of adjustment of the collar 42 is perpendicular to the guideways 24 of the side rails 10. Upon loosening of the locking collars 42 at each end of a cross bar 14, that cross bar 14 may be slid lengthwise of the vehicle to any desired position along the side rails 10.

It will be apparent that the side rails 10 may be cut to any desired length to adapt the luggage racks to automobile roofs of varying sizes. After this is done, the relatively rough cut ends of the side rails 10 will be covered due to their positioning within the sockets 18 of the stanchions 12. Accordingly, any rough "tailoring" of the side rails will not adversely affect the appearance of the luggage rack. It will also be apparent that the locking of the cross bars 14 in any desired position and the adjustment of the cross bars do not require any special tools. On the other hand, the desirable feature of cross bar adjustability is achieved in a design utilizing a minimum number of parts and having a relatively low manufacturing cost.

What is claimed is:

1. A luggage rack for an automobile, or the like, comprising a pair of spaced parallel side rails, each having a guideway extending along one side thereof, supporting means for said side rails, at least one cross bar extending between said side rails, a pair of guides carried at the opposite ends of said cross bar and slidably engageable with said guideways for guided movement therealong, a wall on each of said side rails adjacent the guideway thereof, and a pair of locking collars threadably supported adjacent the opposite ends of said cross bars and threadably adjustable to clamp against said walls and thereby lock said cross bar in a given position.

2. The structure set forth in claim 1 wherein each of said guides has a threaded portion threadably engageable with one of said collars.

3. The structure set forth in claim 1 wherein said guideways comprise channels formed in said side rails, said channels being open to the inner sides of said side rails.

4. The structure set forth in claim 3 including a pair of vertically spaced walls on the inner sides of said side rails, said guides and collars having portions operable to clamp said walls therebetween.

5. The structure set forth in claim 1 wherein said supporting means comprises four stanchions, each of which has a socket receiving one end of one of said side rails.

6. The structure set forth in claim 1 wherein said collar is threadably adjustable in a direction perpendicular to said guideway and has an annular clamping shoulder on one side thereof.

References Cited

UNITED STATES PATENTS 3,325,067   6/1967   Helm _____ 224—42.1

GERALD M. FORLENZA, Primary Examiner

F. E. WERNER, Assistant Examiner